US009946689B2

(12) United States Patent
Morita et al.

(10) Patent No.: US 9,946,689 B2
(45) Date of Patent: Apr. 17, 2018

(54) GENERATING A MOVING DISPLAY IMAGE HAVING A NATIVE IMAGE PLANE AND A WEB IMAGE PLANE APPEARING CONTINUOUSLY ON A SAME PLANE

(71) Applicant: Sony Computer Entertainment Inc., Tokyo (JP)

(72) Inventors: Toru Morita, Tokyo (JP); You Asakura, Tokyo (JP); Koichi Aoki, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 155 days.

(21) Appl. No.: 14/522,061

(22) Filed: Oct. 23, 2014

(65) Prior Publication Data
US 2015/0135044 A1    May 14, 2015

Related U.S. Application Data

(60) Provisional application No. 61/901,535, filed on Nov. 8, 2013.

(51) Int. Cl.
*G06F 17/21* (2006.01)
*H04L 29/08* (2006.01)
(Continued)

(52) U.S. Cl.
CPC ............ *G06F 17/211* (2013.01); *G06F 3/01* (2013.01); *G06F 5/00* (2013.01);
(Continued)

(58) Field of Classification Search
CPC ... G06F 17/211; G06F 17/30905; H04L 67/02
(Continued)

(56) References Cited

U.S. PATENT DOCUMENTS 7,685,535 B2    3/2010  Todoroki et al.
7,975,019 B1 *  7/2011  Green ............... G06Q 30/0241
                                                 705/14.4
(Continued)

FOREIGN PATENT DOCUMENTS

JP    2006139614 A    6/2006
JP    2007280175 A    10/2007
(Continued)

OTHER PUBLICATIONS

Decision to Grant for corresponding JP Patent Application 2014-158691, pp. 1-5, dated May 31, 2016.
(Continued)

*Primary Examiner* — Cesar Paula
*Assistant Examiner* — Luu-Phuong Nguyen
(74) *Attorney, Agent, or Firm* — Matthew B. Dernier, Esq.

(57) ABSTRACT

Disclosed herein is an information processing apparatus including: a native processing section adapted to perform processing based on a program stored therein so as to generate a native image as a processing result; a web processing section adapted to generate a web image based on data requested to a server; and a display image generation section adapted to generate a display image and output the display image to a display device, the display image including an element image making up at least part of the native image and an element image making up at least part of the web image, in which the native processing section and the web processing section move the element images in the same direction when the target to be operated by a user is switched between the native image and the web image to change the configuration of the display image.

11 Claims, 10 Drawing Sheets

(51) Int. Cl.
*G06F 3/01* (2006.01)
*G06F 5/00* (2006.01)
*G06F 17/30* (2006.01)
*G06F 3/048* (2013.01)

(52) U.S. Cl.
CPC ........ *G06F 17/30905* (2013.01); *H04L 67/02* (2013.01); *G06F 3/048* (2013.01); *G06F 17/212* (2013.01); *G06F 17/3089* (2013.01); *G06F 17/30861* (2013.01); *G06F 2203/04803* (2013.01)

(58) Field of Classification Search
USPC ........................................................ 715/202
See application file for complete search history.

(56) References Cited

U.S. PATENT DOCUMENTS

| | | | | |
|---|---|---|---|---|
| 8,549,395 | B2* | 10/2013 | Graves | G06F 17/30905 |
| | | | | 715/234 |
| 8,656,265 | B1* | 2/2014 | Paulin | G06F 17/30899 |
| | | | | 715/205 |
| 8,797,337 | B1* | 8/2014 | Labour | G06F 21/53 |
| | | | | 345/501 |
| 8,843,853 | B1* | 9/2014 | Smoak | G06F 3/0482 |
| | | | | 715/788 |
| 9,842,091 | B2* | 12/2017 | Goodger | G06F 17/2247 |
| 2007/0240054 | A1 | 10/2007 | Todoroki et al. | |
| 2009/0235187 | A1* | 9/2009 | Kim | G06F 17/30905 |
| | | | | 715/760 |
| 2011/0119601 | A1* | 5/2011 | Knothe | G06F 8/38 |
| | | | | 715/760 |
| 2012/0137233 | A1* | 5/2012 | Lewontin | G06F 17/30905 |
| | | | | 715/760 |
| 2012/0210377 | A1* | 8/2012 | Wong | H04N 21/274 |
| | | | | 725/109 |
| 2012/0293558 | A1* | 11/2012 | Dilts | G09G 5/24 |
| | | | | 345/676 |
| 2013/0038211 | A1 | 2/2013 | Kang | |
| 2013/0198686 | A1 | 8/2013 | Kawai | |
| 2013/0328913 | A1* | 12/2013 | Nassar | G06Q 10/105 |
| | | | | 345/619 |
| 2013/0332283 | A1* | 12/2013 | Faith | G06Q 30/0239 |
| | | | | 705/14.64 |
| 2014/0122210 | A1* | 5/2014 | Marshall | G06Q 30/0225 |
| | | | | 705/14.26 |
| 2014/0122994 | A1* | 5/2014 | Beckmann | G06F 17/30274 |
| | | | | 715/234 |
| 2014/0281897 | A1* | 9/2014 | Goodger | G06F 17/2247 |
| | | | | 715/234 |
| 2015/0019623 | A1* | 1/2015 | Garg | H04L 67/02 |
| | | | | 709/203 |

FOREIGN PATENT DOCUMENTS

| | | |
|---|---|---|
| JP | 2008301019 A | 12/2008 |
| JP | 2010066227 A | 3/2010 |
| JP | 2012063940 A | 3/2012 |
| JP | 2012065831 A | 4/2012 |
| JP | 2013016123 A | 1/2013 |
| JP | 2015087569 A | 5/2015 |

OTHER PUBLICATIONS

Office Action for corresponding JP Patent Application 2014-158691, pp. 1-6, dated Oct. 13, 2015.
Office Action for corresponding EP Patent Application 14275214.6, 8 Pages, dated Nov. 6, 2017.
J Huhtala, A Sarjanoja, J Mantyvjarvi, M Isomursu, J Hakkila, "Mobile Screen Transition Animations", SIGGRAPH New Orleans, Louisiana, XP58201250, 1 page, (Aug. 2009).

* cited by examiner

GENERATING A MOVING DISPLAY IMAGE HAVING A NATIVE IMAGE PLANE AND A WEB IMAGE PLANE APPEARING CONTINUOUSLY ON A SAME PLANE

BACKGROUND

The present disclosure relates to an information processing apparatus for performing information processing while at the same time displaying an image in response to user operation, an information processing method of the same, a computer program, and a recording medium.

Recent evolution of information processing technologies and enhancement of the communication environment and so forth have made it possible to implement information processing in a variety of ways irrespective of the performance of the personal computer or mobile terminal used by a user and the environment in which such a device is used. For example, a technology has been proposed in which the terminal operated by a user and the information processing apparatus adapted to perform information processing in accordance with the operation are separated so as to output sophisticated information even from a mobile terminal that is simple in configuration, and the like (for example, refer to Japanese Patent Laid-Open No. 2012-65831).

SUMMARY

A so-called web application which is premised on performing information processing through coordinated operation with a server constantly allows for processing using up-to-date data made available by the server and permits access to up-to-date information. On the other hand, the communication condition at that point in time is likely to affect the processing capability such as responsiveness. Therefore, a technology is sought after which can strike a balance between up-to-dateness of information and information processing speed and responsiveness.

In light of the foregoing, it is desirable to provide an image display technology that combines information processing speed and up-to-dateness of information.

One mode of the present disclosure relates to an information processing apparatus. The information processing apparatus includes: a native processing section adapted to perform processing based on a program stored therein so as to generate a native image as a processing result; a web processing section adapted to generate a web image based on data requested to a server; and a display image generation section adapted to generate a display image and output the display image to a display device, the display image including an element image making up at least part of the native image and an element image making up at least part of the web image, in which the native processing section and the web processing section move the element images, each making up one of the native and web images, in a same direction when a target to be operated by a user is switched between the native image and the web image so as to change a configuration of the display image.

Another mode of the present disclosure relates to an information processing method. The information processing method makes a change to an image displayed by an information processing apparatus on a display device in response to a user operation. The information processing method includes: reading a program stored in an internal storage device and performing processing based on the program so as to generate a native image as a processing result; generating a web image based on data requested to a server; generating a display image and outputting the display image to the display device, the display image including an element image making up at least part of the native image and an element image making up at least part of the web image; and moving the element images, each making up one of the native and web images, in a same direction when a target to be operated by a user is switched between the native image and the web image so as to change a configuration of the display image.

Still another mode of the present disclosure relates to a computer program for a computer. The computer program includes: performing processing based on data stored in an internal storage device so as to generate a native image as a processing result; generating a web image based on data requested to a server; generating a display image and outputting the display image to a display device, the display image including an element image making up at least part of the native image and an element image making up at least part of the web image; and moving the element images, each making up one of the native and web images, in a same direction when a target to be operated by a user is switched between the native image and the web image so as to change a configuration of the display image.

Yet another mode of the present disclosure relates to a computer-readable recording medium in which a computer program for a computer is stored. The computer program includes: performing processing based on data stored in an internal storage device so as to generate a native image as a processing result; generating a web image based on data requested to a server; generating a display image and outputting the display image to a display device, the display image including an element image making up at least part of the native image and an element image making up at least part of the web image; and moving the element images, each making up one of the native and web images, in a same direction when a target to be operated by a user is switched between the native image and the web image so as to change a configuration of the display image.

It should be noted that any combinations of the above components and any conversions of expressions of the present disclosure between "method," "apparatus," "system," "computer program," and so on are also effective as modes of the present disclosure.

The present disclosure permits image display that strikes a balance between information processing speed and up-to-dateness of information.

DETAILED DESCRIPTION OF THE PREFERRED EMBODIMENT

Figure 1:
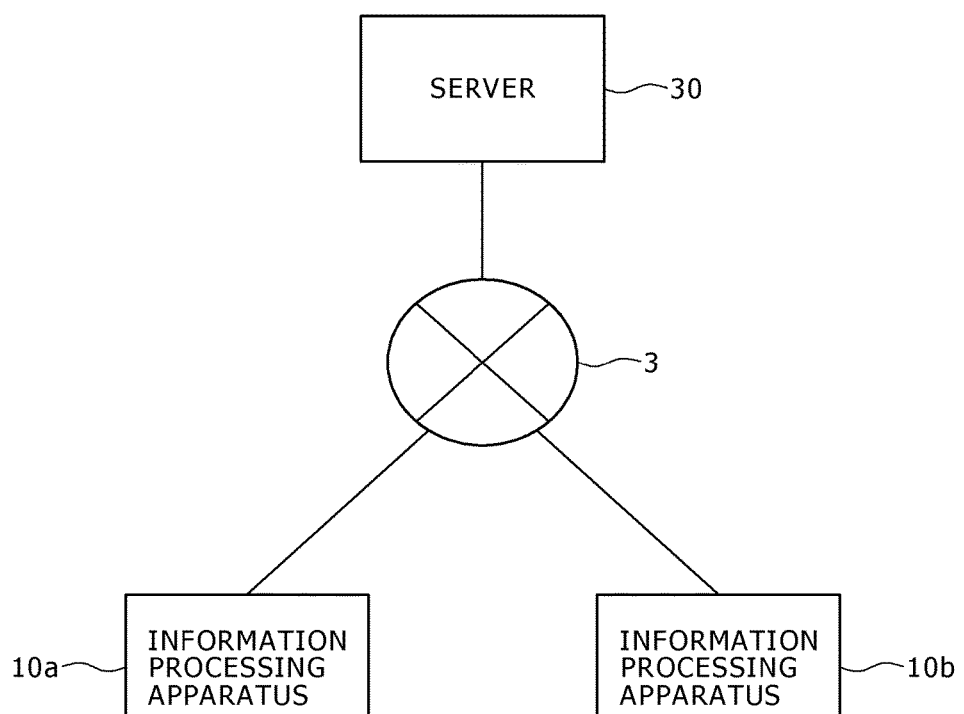
FIG. 1 is a diagram illustrating a configuration of an information processing system according to a present embodiment.

FIG. 1 illustrates a configuration of an information processing system according to the present embodiment. In an information processing system 1, information processing apparatus 10a and 10b are apparatus operated by users such as personal computers, tablets, mobile phones, mobile terminals, game consoles, and the like. A server 30 transmits data such as webpage to be displayed on the information processing apparatus 10. Alternatively, the server 30 performs information processing in response to requests from the information processing apparatus 10a and 10b and transmits data generated as a result of the processing to the information processing apparatus 10a and 10b.

The information processing apparatus 10a and 10b and the server 30 are connected to a network 3 in a wired or wireless manner. Common technologies can be used to achieve a connection mechanism and a data exchange procedure between information processing apparatus 10a and 10b and the server 30. It should be noted that the number of the information processing apparatus 10a and 10b and the server 30 connected to the network 3 is not specifically limited. The information processing apparatus 10a and 10b will be hereinafter collectively referred to as the information processing apparatus 10.

Figure 2:
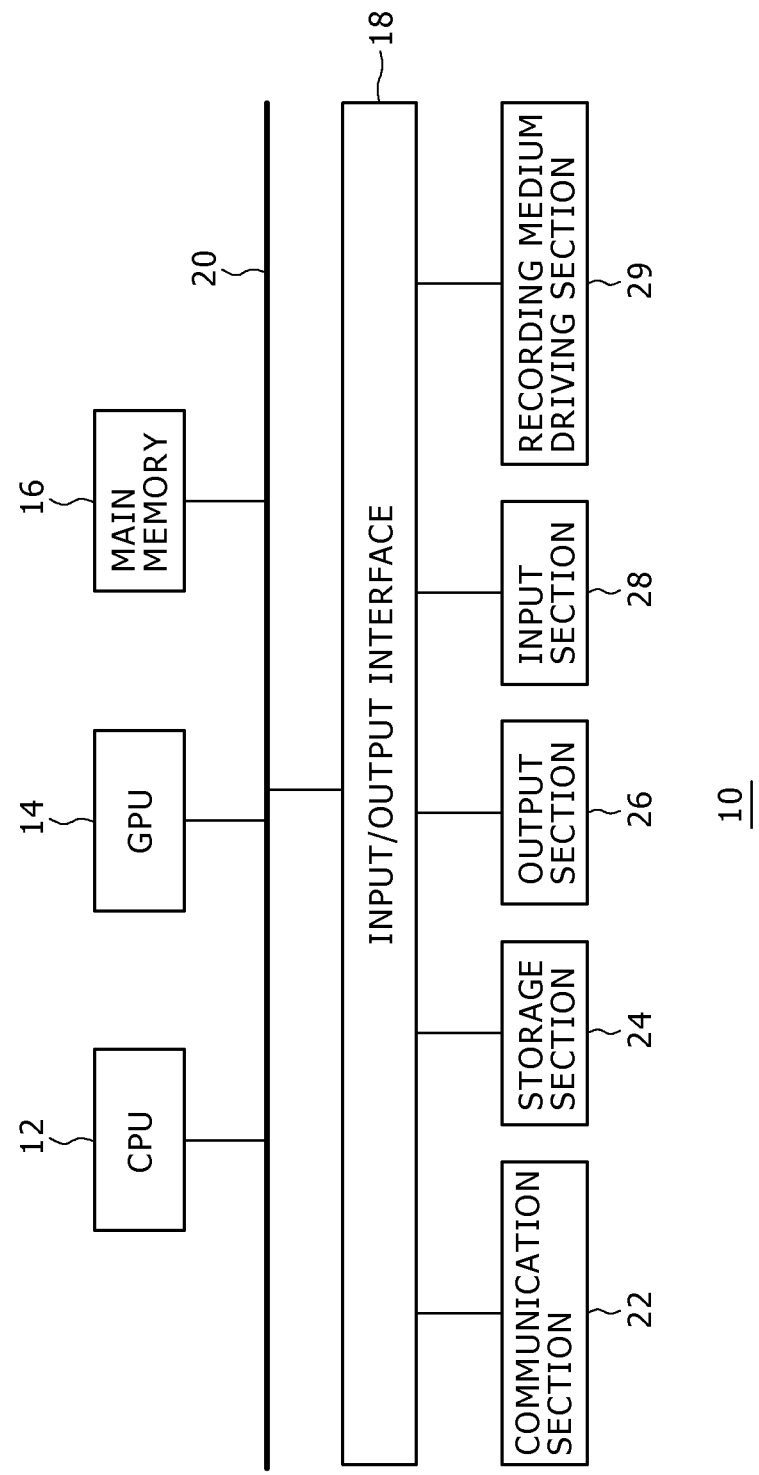
FIG. 2 is a diagram illustrating an internal circuit configuration of an information processing apparatus according to the present embodiment.

FIG. 2 illustrates an internal circuit configuration of the information processing apparatus 10. The information processing apparatus 10 includes a CPU (Central Processing Unit) 12, a GPU (Graphics Processing Unit) 14, and a main memory 16. The CPU 12 controls the processing and signal transfer handled by the components in the information processing apparatus 10 based on an operating system, an application, or other program. The GPU 14 handles image processing. The main memory 16 includes a RAM (Random Access Memory) and stores programs and data necessary for processing.

These sections are connected to each other via a bus 20. An input/output interface 18 is also connected to the bus 20. A communication section 22, a storage section 24, an output section 26, an input section 28, and a recording medium driving section 29 are connected to the input/output interface 18. The communication section 22 includes a peripheral interface such as USB (Universal Serial Bus) and IEEE1394 and wired or wireless LAN (Local Area Network) interface. The storage section 24 includes a hard disk drive, a non-volatile memory, and so on. The output section 26 outputs data such as images and sounds. The input section 28 accepts user inputs from external devices. The recording medium driving section 29 drives a removable recording medium such as magnetic disk, optical disc, or semiconductor memory.

The CPU 12 controls the entire information processing apparatus 10 by executing the operating system stored in the storage section 24. The CPU 12 also executes the application programs read from the removable recording medium and loaded into the main memory 16. These programs include not only native application programs whose processing is completed within the information processing apparatus but also web application programs whose processing progresses through coordinated operation with the server 30. The GPU 14 has a geometry engine function and a rendering processor function, performing drawing in accordance with a drawing instruction from the CPU 12 and storing a display image in a frame buffer which is not shown. Then, the display image stored in the frame buffer is converted into a video signal and output to the output section 26.

The input section 28 includes not only ordinary input devices such as a keyboard, a touchpad, buttons, joysticks, a microphone, and a camera, but also a mechanism adapted to acquire input signals from these input devices. The output section 26 includes not only ordinary output devices such as display adapted to display an image and a speaker adapted to output sounds but also a mechanism adapted to transmit output signals to these output devices. The communication section 22 communicates with the server 30 in accordance with a given protocol such as HTTP, transmitting a necessary request or receiving data.

The information processing apparatus 10, the input devices included in the input section 28, and the display included in the output section 26, may have their respective enclosures and be connected to each other by cables. Alternatively, wireless connection may be established therebetween using, for example, Bluetooth (registered trademark) protocol or IEEE802.11 protocol. Still alternatively, these may have an integral enclosure in which they are connected to each other. For example, a portable game console, tablet terminal, a high-performance mobile phone, or the like may be implemented by providing a display on the surface of the enclosure and a touchpad on the front face of the display for use as an input device.

The information processing apparatus 10 retains a native code in the storage device 24. The native code is generated by compiling a source code written in a programming language such as C language. The information processing apparatus 10 reads the native code when the information processing apparatus 10 starts up or in response to a user operation, executing the native code, and thereby generating and displaying a display screen. The information processing apparatus 10 further requests data or processing appropriate to a user operation to the server 30 and interprets display screen data, transmitted in response to the request, using a web browser and displays the display screen. Display screen data transmitted here is commonly written in a markup language such as HTML (Hypertext Markup Language). As a result, the display screen can be displayed irrespective of the OS (Operating System) of the information processing apparatus.

An application executed in the former manner will be referred to as a native application, and an application executed in the latter manner will be referred to as a web application. A native application commonly offers higher processing speed and faster responsiveness than a web application that is executed via the server 30. A web application is primarily processed by the server 30, thus making it possible to always perform processing with an up-to-date program and provide up-to-date information.

Therefore, native and web applications should preferably be selectively used according, for example, to the nature of information processing or the processing capability. One example would be to use a native application to implement information processing requiring addition of a complicated motion to the display screen or fast responsiveness, and use a web application to implement information processing requiring provision of up-to-date information or for which only a relatively simple motion is sufficient. In the present embodiment, two types of output images, one obtained from a native application and another obtained from a web application, are combined in a single display screen, thus pursuing operability, design quality, and up-to-dateness of information at the same time. In order to clarify the features of the present embodiment, a description will be given first of standard manners of displaying screens when native and web applications are executed.

Figure 3:
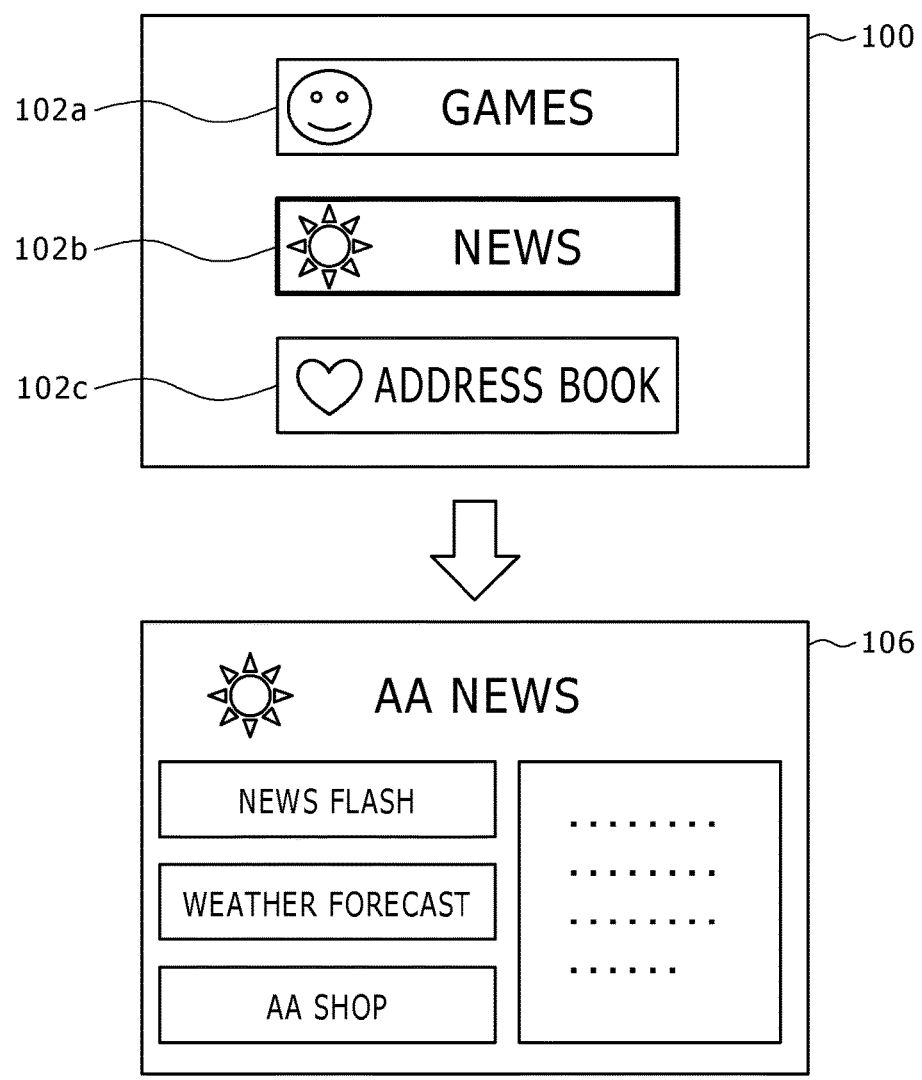
FIG. 3 is a diagram illustrating examples of standard display screens when native and web applications are executed.

FIG. 3 illustrates examples of standard display screens when native and web applications are executed. First, three GUI (Graphical User Interface) components 102a, 102b, and 102c are displayed in a menu screen 100 shown at the top by a native application to select one of the functions "Games," "News," and "Address Book." The native application has been installed in advance in the information processing apparatus. At this time, the interpretation of user operation on the GUI components 102a, 102b, and 102c and processing appropriate thereto are defined by the program making up the native application.

Here, when the GUI component 102b for "News" used to view a news site is selected from among the three options included in the menu screen 100, a web browser is started up in the information processing apparatus. Then, as a result of communication with the server that runs the news site, the display is switched to a browser screen 106 that shows a webpage. As the nature of user operation performed on the browser screen 106 is transmitted from the information processing apparatus to the server, new webpage data is transmitted, thus updating the browser screen 106.

FIG. 3 illustrates an example in which an entire display screen is switched. However, if a plurality of windows can be displayed, the target application image to be operated at that point in time appears in the window at the foreground. In any case, the display screens generated by the two applications are basically not related and are displayed independently. In the present embodiment, such commonly independent display screens are combined. Further, screens are seamlessly changed in response to switching from one target to be operated to another.

More specifically, at least part of a display image generated by the native application (hereinafter referred to as a native image) and part of a display image generated by the web application (hereinafter referred to as a web image) are changed to transparent or translucent first, after which the images are superimposed one above the other. This ensures that the areas other than the background (hereinafter referred to as element images) such as icons, UI (User Interface) components, text information, graphics, thumbnail images, i.e., components of each image, are displayed at the same time without being hidden.

At this time, either element images generated by the native application or element images generated by the web application are used as element images that can be operated as GUIs, i.e., "GUI components." This makes clear which of the two applications is the target to be operated. As a result, even if the native and web applications are combined in the screen, switching between the two applications is obvious. Further, it is possible to maintain the ease of operation of each of the applications.

Figure 4:
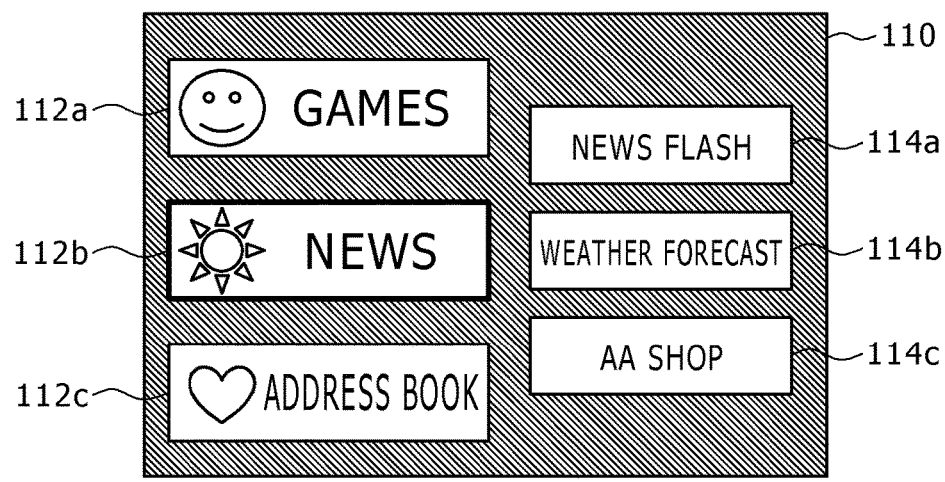
FIG. 4 is a diagram illustrating an example of a display screen that appears by superimposing native and web images in the present embodiment.

FIG. 4 illustrates an example of a display screen that appears by superimposing native and web images. Three GUI components 112a, 112b, and 112c are displayed in a menu screen 110 to select one of the functions, "Games," "News," and "Address Book," as in the menu screen 100 shown in FIG. 3. The menu screen 110 further shows the images to be displayed when the "News" function, a function of interest for the user at this point in time, is selected. These images are element images 114a, 114b, and 114c that are at least some of the images included in the news site webpage. These images are displayed before the actual webpage is displayed.

That is, before the selection of the "News" function is confirmed, part of the information in the webpage is displayed. This allows the user to determine whether or not to confirm the selection. A GUI component of interest may be selected, for example, by moving the cursor (not shown) appearing on the display screen to the desired GUI component. Alternatively, a GUI component of interest may be selected by scrolling the screen and moving the desired GUI component to a given position. At this time, the GUI component in question is highlighted, for example, by enclosing the component in a bold frame as illustrated in the figure to make it clear that it is a component of interest. In any case, the element images 114a, 114b, and 114c are drawn based on the webpage data acquired by the web application from the server 30.

Figure 5:
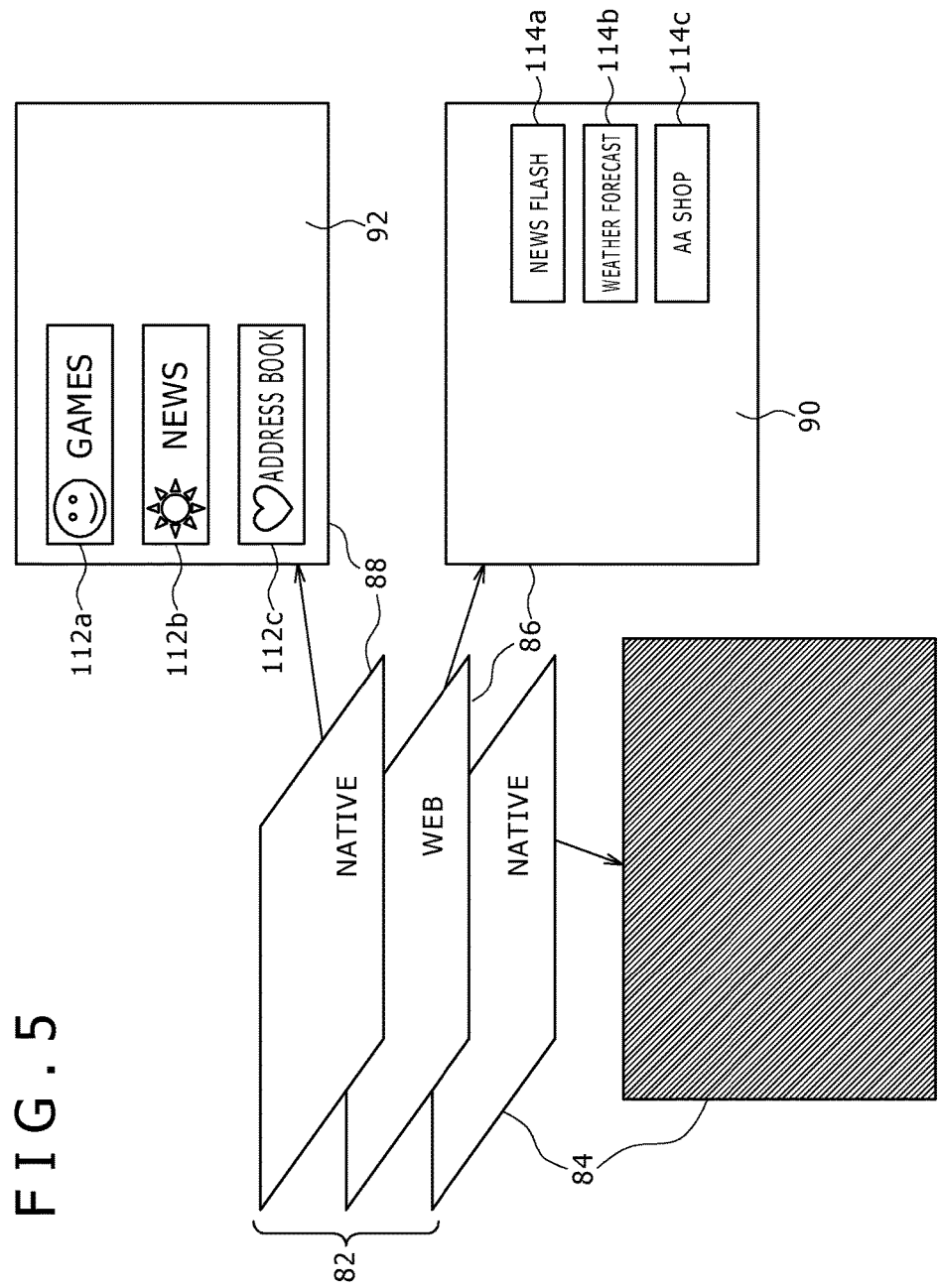
FIG. 5 is a diagram illustrating an example of a configuration of images that are superimposed to display a menu screen shown in FIG. 4.

FIG. 5 illustrates an example of a configuration of images that are superimposed to display the menu screen 110 shown in FIG. 4. In this example, the menu screen 110 has a three-layer structure 82 made up of a native image 84 at the lowermost layer, a web image 86 at the intermediate layer, and a native image 88 at the uppermost layer. It should be noted, however, that the number of layers and the order in which the layers are stacked are not limited thereto. The native image 84 at the lowermost layer makes up the background of the menu screen 110 and makes the entire image opaque. It should be noted that the entire image is filled by shading in the figure. However, a still image, a movie, or other image may be appropriately selected according to an intended design. The native image 84 is drawn by a native code. This makes it possible to display an image smoothly even when the image has a complicated motion.

The web image 86 at the intermediate layer includes the element images 114a, 114b, and 114c of the webpage displayed in the menu screen 110 shown in FIG. 4. An area 90 other than these element images is transparent or translucent. The native image 88 at the uppermost layer includes the GUI components 112a, 112b, and 112c displayed in the menu screen 110 shown in FIG. 4. An area 92 other than these GUI components is transparent or translucent. When these images are displayed in a manner superimposed one above the other, the menu screen 110 shown in FIG. 4 appears in which the element images 114a, 114b, and 114c and the GUI components 112a, 112b, and 112c are arranged on the background at the same time.

It should be noted that if the function of interest is, for example, "Games" or "Address Book" which is executed by the native application, the entire web image 86 may be transparent or translucent, with game title images or thumbnail images of the address book further appearing in the native image 88. Such a configuration provides the same screen configuration for both the native and web applications, thus allowing the user to acquire information about the function of interest before actually confirming the selection of the function of interest.

At this time, the information processing apparatus 10 performs two processes concurrently, one for processing the native application to draw the native images and another for processing part of the web application to draw the web image. Then, when "News," the function of the web application, becomes a function of interest in the menu screen 110, the process of the native application notifies the process of the web application to that effect.

In response to the notice, the process of the web application requests, to the server 30, data used to draw the web image 86 including the element images 114*a*, 114*b*, and 114*c*, thus generating the web image 86. It should be noted that the screen as a whole has a three-layer structure in the example shown in FIG. 5. However, only some areas may be superimposed one above the other in the screen. Alternatively, the number of layers and the order in which the layers are stacked may be changed from one area to another in the screen.

Figure 6:
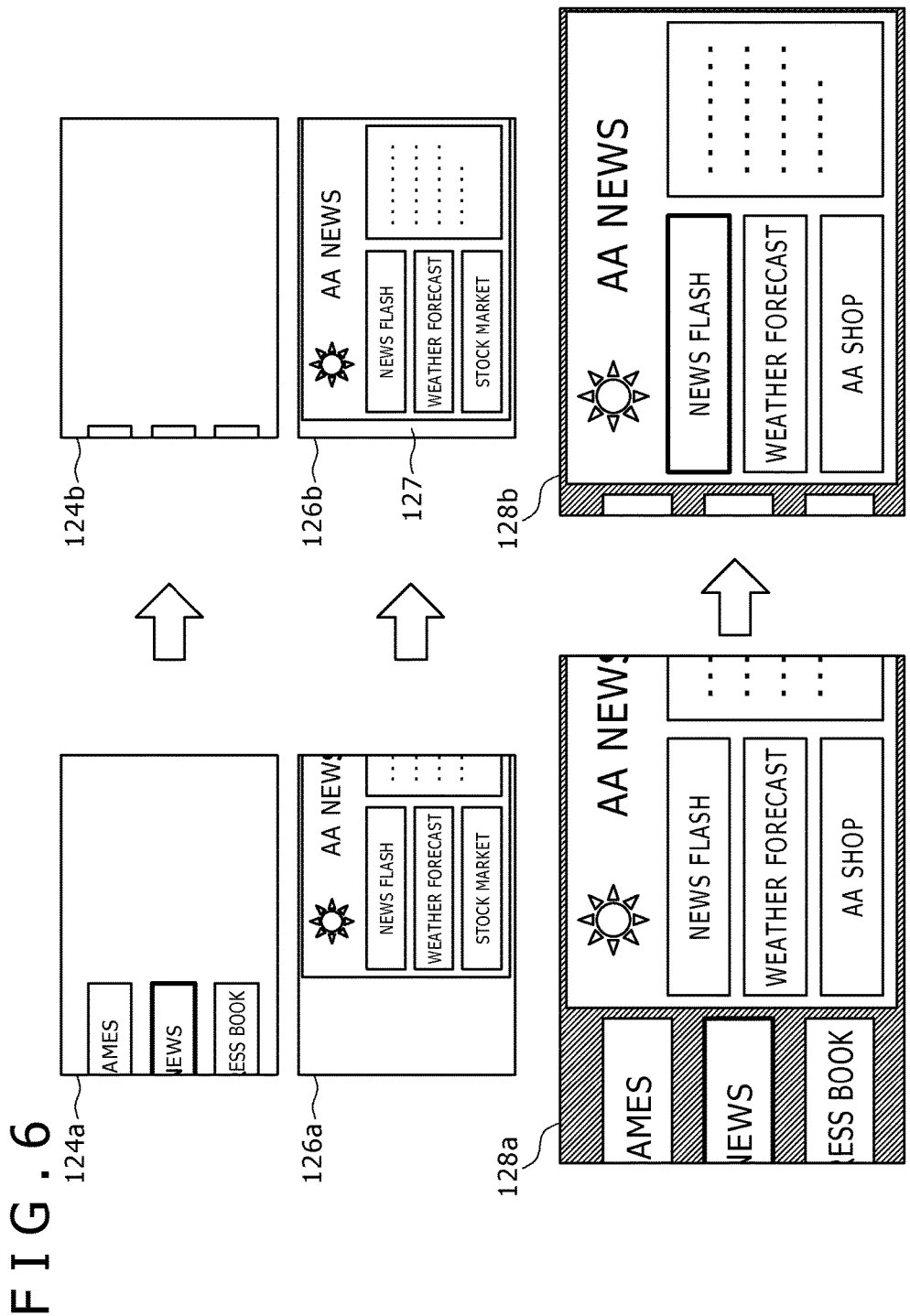
FIG. 6 is a diagram illustrating an example of a change that occurs in the screen when a user confirms the selection of a "News" function in the menu screen shown in FIG. 4.

If the native and web images are combined from the beginning by using the configuration as described above, it is possible to implement seamless switching between targets to be operated as shown in FIG. 3. FIG. 6 illustrates an example of change that occurs in the screen when a user confirms the selection of the "News" function in the menu screen 110 shown in FIG. 4. In the figure, three images on the left are a native image 124*a* at the uppermost layer, a web image 126*a* at the intermediate layer, and a display screen 128*a* in the process of transition from the menu screen 110 shown in FIG. 4. The display screen 128*a* appears as a result of display of the native image 124*a*, the web image 126*a*, and the native image of the background image in a manner superimposed one above the other.

The three images on the right are a native image 124*b* at the uppermost layer, a web image 126*b* at the intermediate layer, and an ultimate webpage display screen 128*b* in the ultimate state where the news site webpage is displayed. The ultimate webpage display screen 128*b* appears as a result of display of the native image 124*b*, the web image 126*b*, and the native image of the background image in a manner superimposed one above the other. It should be noted that the native image of the background image is not shown because the same image as the native image 84 shown in FIG. 5 may be used as the native image of the background image. However, the native image 84 may be changed to other image with a different design.

If the selection of "News," the web application function, is confirmed in the menu screen 110 shown in FIG. 4, a transition process is provided as illustrated in the figure in which the screen as a whole scrolls in a given direction which is to the left in the figure. At this time, the three GUI components in the native image 124*a* gradually disappear from the left edge of the screen, and the webpage gradually emerges from the right edge of the screen at the same speed in the web image 126*a*.

In the menu screen 110 in the initial state shown in FIG. 4, the element images 114*a*, 114*b*, and 114*c* of the webpage are already displayed. Therefore, if a webpage emerges or titles are superimposed in step with the motion of these element images, it is possible to implement a screen transition having a continuity in time such as a transition from the menu screen 110 to the display screen 128*a* and to the display screen 128*b*. In the example shown in FIG. 6, as the selection of "News" is confirmed, "AA News," a page title, emerges at the top of the screen of the web image 126*a*. In addition, the articles on the right of the webpage gradually emerge.

Further, in the example shown in FIG. 6, even when the ultimate webpage display screen 128*b* is reached, very small portions of the right edges of the three element images, the GUI components in the menu screen 110, are left unremoved in the native image 124*b*, and an area 127 is provided on the left edge of the web image 126*b* so that these very small portions are displayed in the area 127. This arouses the imagination that the original menu screen 110 exists outside the webpage display screen 128*b*, thus making it easy to understand the relation between the two as a positional relationship. Further, it is possible to implement a unique display in which although a different application is started up, the two screens are connected in the image.

It should be noted that the element images of the native image that are left unremoved in the ultimate webpage display screen 128*b* are not limited to very small portions as illustrated in the figure. Instead, a given area or the entire area may be left unremoved. For example, all the element images of "News" whose selection has been confirmed may be continuously displayed in the display screen 128*b*. In this case, the webpage may be displayed in a somewhat smaller size to provide a display area for the element images of the native image. Alternatively, at least part of the element images may be superimposed on the webpage. In the present embodiment, the native and web images are displayed in a manner superimposed one above the other, thus making it possible to combine and arrange the images in a variety of ways to suit a desired design.

If the three GUI components appearing in the menu screen 110 as options are arranged vertically as illustrated in FIG. 4, the component of interest can be selected by moving the cursor up and down or scrolling the screen up and down as described above. Therefore, if moving the cursor to the right or scrolling the screen to the left with the "News" GUI component selected as the component of interest is used to confirm the selection of this GUI component, this operation is highly compatible with the emergence of the webpage from the right edge of the screen, thus allowing for a transition to the webpage display screen with a natural motion.

Similarly, if the webpage emerges from the left edge of the screen, the cursor is moved to the left or the screen is scrolled to the right with the desired GUI component selected as the component of interest so as to confirm the selection. If the GUI components are arranged horizontally, the selection is confirmed by moving the cursor in the appropriate direction or scrolling the screen in the opposite direction depending on whether the webpage emerges from the top or bottom. It should be noted that the cursor movement or the screen scrolling may be implemented by a common method using the input device, such as a mouse, joysticks, a direction indicating button, and a touchpad, included in the input section 28.

Further, the present embodiment is not limited to causing the webpage to emerge from an edge of the screen. Instead, a transparent webpage may emerge over the entire screen by becoming gradually opaque. The element images in the native image appearing in the menu screen may become gradually transparent in step with the emergence of the webpage. It should be noted that the screen shown in FIG. 6 is an example, and that it is not always necessary to leave the element images of the native image unremoved in the webpage display screen 128*b*. In addition to the cursor movement and the screen scrolling as described above, a given button of the input device such as direction indicating button may be pressed once to confirm the selection of a GUI component.

When the webpage display screen 128b is displayed, the webpage serves as a target to be operated and accepts an operation in the same manner as does an ordinary webpage. For example, the webpage switches the element images of the web image such as "News Flash," "Weather Forecast," and "AA Shop" in the menu screen 110 to GUI components when the display screen 128b is reached, accepting an operation on the GUI components. In the example shown in FIG. 6, the "News Flash" GUI component is highlighted as a component of interest. If, for example, the selection is confirmed in this condition, the webpage will undergo a change depending on which GUI component is operated. One among such changes is displaying the news flash articles.

If the webpage display screen 128b is switched back to the menu screen 110, a transition process is provided in which the screen as a whole scrolls in the opposite direction which is to the right in FIG. 6. At this time, if the user moves the cursor to the left or scrolls the screen to the right which are the opposite directions to when the webpage display screen 128b is switched from the menu screen 110, it is possible to provide a continuity between images. Alternatively, a given button of the input device such as direction indicating button may be pressed once.

Hereinafter, the state in which an operation on the native image such as the menu screen 110 shown in FIG. 4 is accepted will be referred to as native mode, and the state in which an operation on the web image such as the webpage display screen 128b shown in FIG. 6 is accepted will be referred to as web mode. In the present embodiment, an arrangement is made to display the native and web images as if they appear continuously on the same image plane. At the same time, native mode is switched to web mode and vice versa for a target to be operated to make a distinction between the two modes as described above.

Figure 7:
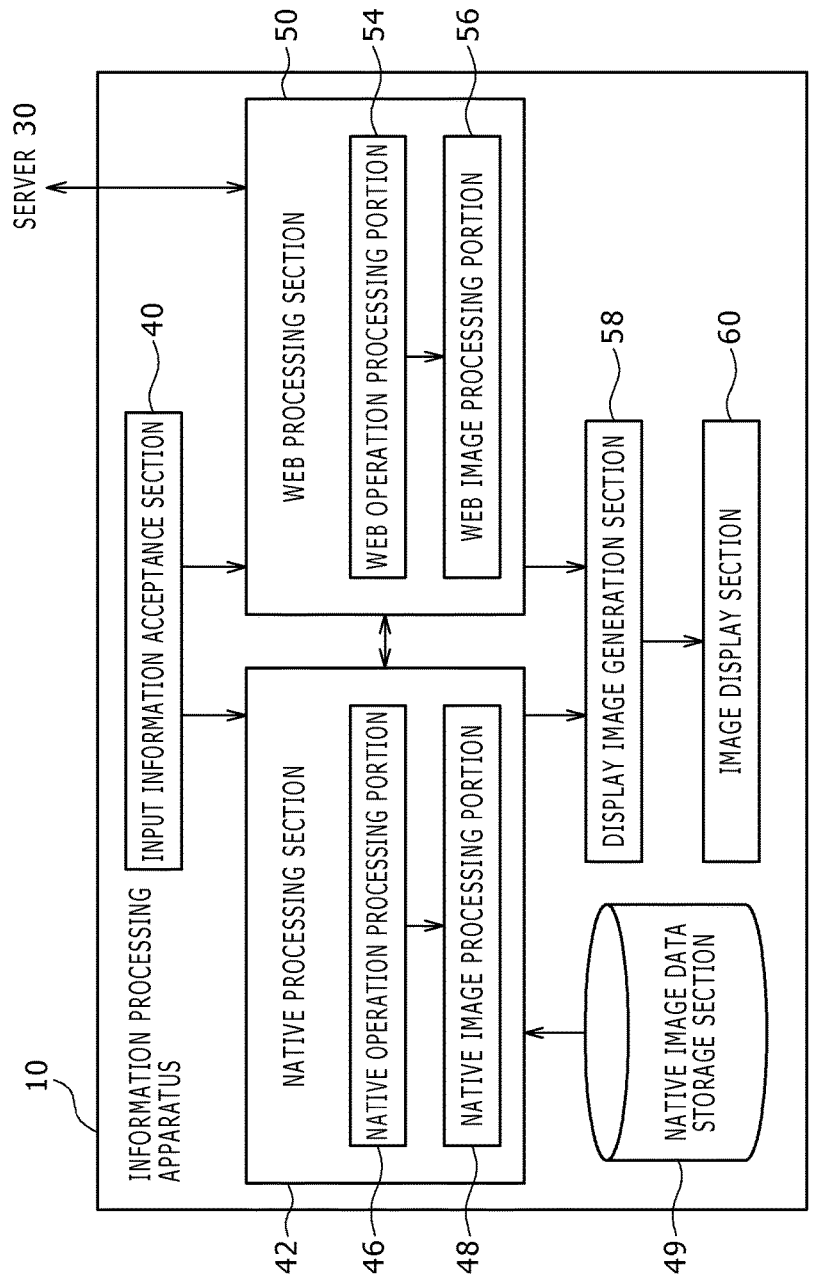
FIG. 7 is a diagram illustrating a functional configuration of the information processing apparatus according to the present embodiment.

FIG. 7 illustrates a functional configuration of the information processing apparatus 10. The information processing apparatus 10 includes an input information acceptance section 40, a native processing section 42, a native image data storage section 49, a web processing section 50, a display image generation section 58, and an image display section 60. The input information acceptance section 40 accepts user operation. The native processing section 42 performs processing for native applications. The native image data storage section 49 stores data used to draw native images. The web processing section 50 performs processing for web applications. The display image generation section 58 superimposes images displayed by native and web applications, thus generating a display image. The image display section 60 displays a display image.

In FIG. 7, each of the components described as a functional block adapted to handle various processing can be configured, in terms of hardware, by a CPU (Central Processing Unit), a memory, or other LSI (Large Scale Integration), and, in terms of software, for example, by a program stored in a recording medium or storage device and loaded into a memory, as described above. Therefore, it is understood by those skilled in the art that these functional blocks can be implemented in various ways by hardware alone, software alone, or a combination thereof. The present disclosure is not limited to any one of them.

The input information acceptance section 40 is implemented by the input section 28 shown in FIG. 2. The input information acceptance section 40 accepts an operation performed on the information processing apparatus 10 by the user and notifies the native processing section 42 and the web processing section 50 of the information. The native processing section 42 is implemented by the CPU 12, the GPU 14, and so on. The native processing section 42 executes the native application program loaded into the main memory 16 from the storage section 24, thus generating a native image. The web processing section 50 is implemented by the CPU 12, the GPU 14, and so on. The web processing section 50 executes the web browser program loaded into the main memory 16 from the storage section 24, thus generating a web image through coordinated operation with the server 30.

It should be noted that the native processing section 42 and the web processing section 50 may be implemented as the CPU 12 handles the generated processes concurrently as described above. Native and web images are superimposed one above the other at all times as described above. These images undergo a change in a coordinated fashion. Therefore, the native processing section 42 and the web processing section 50 exchange messages as necessary while internal processing is underway.

The native processing section 42 includes a native operation processing portion 46 and a native image processing portion 48. The native operation processing portion 46 performs processing in accordance with the operation performed on the GUI components included in the native image in native mode. Further, the native operation processing portion 46 performs processing in accordance with the operation performed on the native application under execution such as game or various information processing. The latter processing is dependent upon the nature of the application. The native image processing portion 48 makes a change to the native image during switching between native and web modes and generates, as a native image, the result of processing performed by the native operation processing portion 46 in native mode. Further, the native image processing portion 48 makes a change to the web image as necessary in web mode, as well. The native image is drawn using image data stored in the native image data storage section 49.

The web processing section 50 includes a web operation processing portion 54 and a web image processing portion 56. The web operation processing portion 54 transmits, to the server 30, a request appropriate to the operation performed on one of the GUI components included in the web image in web mode and a request appropriate to the operation performed on the web application under execution. Then, the web operation processing portion 54 causes the web image processing portion 56 to generate a web image using data transmitted from the server 30 and process a plugin. The web image processing portion 56 makes a change to the web image during switching between native and web modes and generates a web image based on data supplied from the web operation processing portion 54 in web mode. Further, the web image processing portion 56 makes a change to the web image as necessary in native mode as well by requesting data to the server 30.

The display image generation section 58 is implemented by the CPU 12, the GPU 14, and so on. The display image generation section 58 generates a display image by superimposing a native image generated by the native image processing portion 48 of the native processing section 42 and a web image generated by the web image processing portion 56 of the web processing section 50. In the example shown in FIG. 5, the former acquires two native images making up the lowermost and uppermost layers from the native image processing portion 48 and a web image making up the intermediate layer from the web image processing portion 56, superimposing these images. The generated display image is stored in the internal frame memory. The image display section 60 is implemented by the input/output interface 18 and the output section 26. The image display section 60 reads the display images, generated by the display image generation section 58 and stored in the frame memory, one after another and displays these images on a display.

Figure 8:
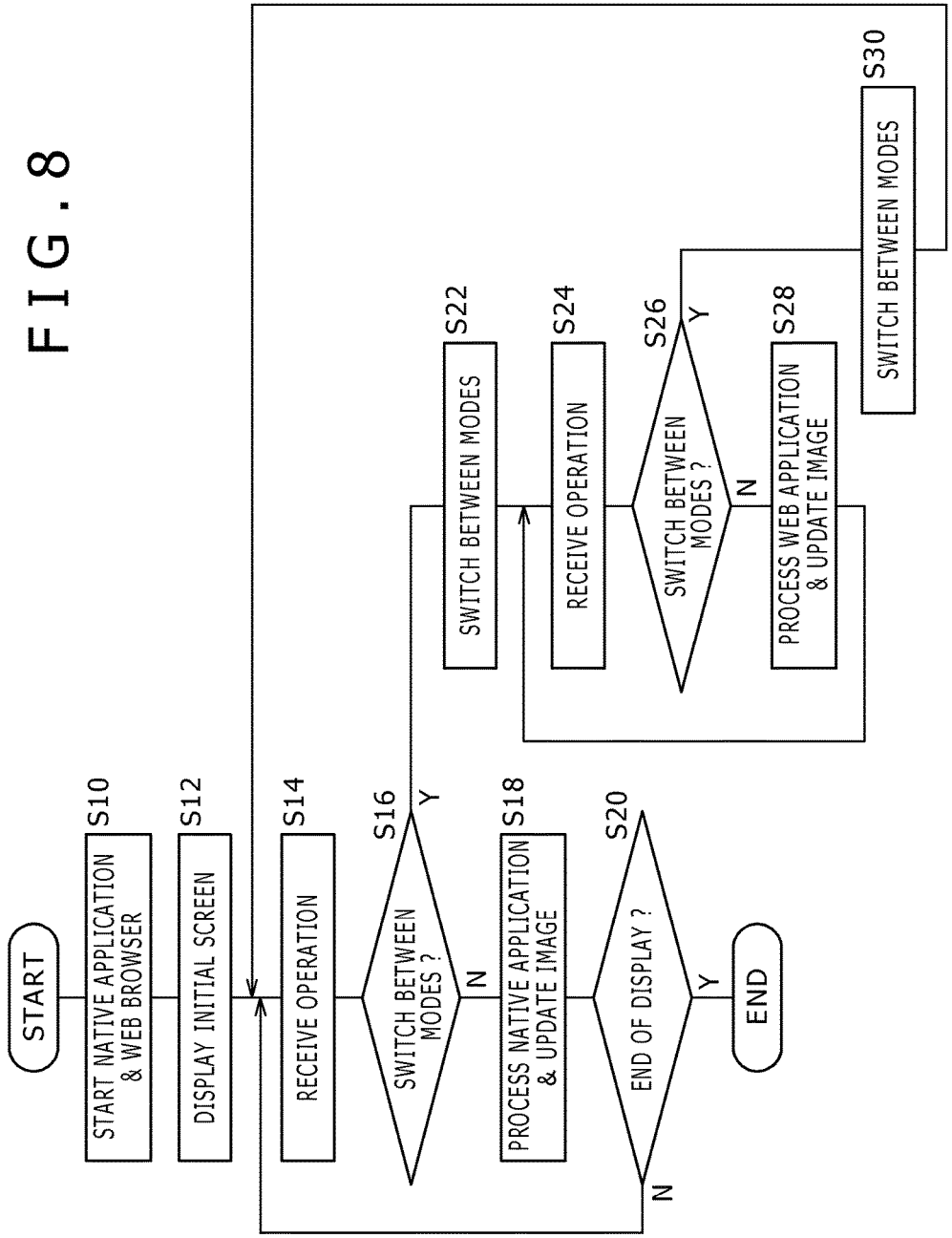
FIG. 8 is a flowchart illustrating steps through which the information processing apparatus according to the present embodiment goes to display an image appropriate to a user operation while at the same time switching between modes.

A description will be given next of the operation of the information processing apparatus 10 that is implemented by the configuration described so far. FIG. 8 illustrates steps through which the information processing apparatus 10 goes to display an image appropriate to a user operation while at the same time switching between modes. First, the information processing apparatus 10 starts the native application and the web browser (S10). More specifically, for example, the native application is started by the user operation, and the web browser is started from within the program thereof. As a result, the native processing section 42 generates an initial native image, whereas the web processing section 50 generates an initial web image. The display image generation section 58 superimposes these images, thus generating an initial screen and displaying the screen on the display (S12).

The initial native image is generated using the data stored in the native image data storage section 49, whereas the initial web image is generated using the data transmitted from the server 30 in response to a request made to the server 30. Such processing allows, for example, an initial screen such as the menu screen 110 shown in FIG. 4, to be displayed. It should be noted, however, that element images of the web image is not necessarily included in the initial screen. In this case, the entire web image may be transparent or translucent. It should be noted that although the initial screen is in native mode in FIG. 8, this screen may be in web mode.

Next, a user operation on the initial screen displayed as described above is accepted (S14). If this operation is not that for switching one mode to another (N in S16), the native application is processed in accordance with the user operation, thus updating the image (S18). At this time, the native image is updated according to the processing, and the web image is updated as necessary.

For example, if the GUI component of interest is changed to another component in the menu screen 110 shown in FIG. 4, the element images of the web image displayed on the right are switched to the element images included in the webpage of the site appropriate to the changed GUI component. Further, if the native image is displayed across the entire screen as a result of the confirmation of the execution of the native application such as game, the element images of the web image may be deleted. In any case, the display image generation section 58 maintains the native and web images superimposed. While the user does not perform any operation to terminate the display (N in S20), a further user operation is waited in this condition.

If the user operation is that for switching one mode to another (S14, Y in S16), which is, for example, the confirmation of the selection of the "News" GUI component in the menu screen 110, both the native processing section 42 and the web processing section 50 switch between the modes (S22). More specifically, the native image processing portion 48 of the native processing section 42 generates an animation frame in which the element images of the native image, namely, the three GUI components 112a, 112b, and 112c in the menu screen 110 shown in FIG. 4, move in a given direction in the screen and disappear from one of the screen edges.

The web image processing portion 56 of the web processing section 50 generates an animation frame in which the element images of the web image, namely, the element images 114a, 114b, and 114c in the menu screen 110 shown in FIG. 4, move in the same given direction in the screen and in which the remaining webpage image emerges from the screen edge on the opposite side of that from which the element images of the native image disappeared. The display image generation section 58 synchronizes and superimposes the frames of the generated native and web images and outputs the resultant images to the image display section 60, thus displaying a screen that undergoes a change as shown in FIG. 6. When the ultimate display screen appears, the native operation processing portion 46 of the native processing section 42 suspends the processing, and the web operation processing portion 54 of the web processing section 50 starts the processing, thus switching native mode to web mode.

Then, a user operation on the webpage, the main component in the screen, is accepted (S24). If this operation is not that for switching one mode to another (N in S26), the web application is processed in accordance with the user operation, thus updating the image (S28). Then, a further operation is waited. At this time, the web operation processing portion 54 and the web image processing portion 56 basically update the webpage in the screen through coordinated operation with the server 30. Depending on the nature of operation, however, the element images of the native image that are left unremoved in the screen may be deleted by the native image processing portion 48. In this case, the display image generation section 58 maintains the native and web images superimposed.

If the user operation is that for switching one mode to another (S24, Y in S26), both the native processing section 42 and the web processing section 50 switch between the modes (S30). In this case, the web image processing portion 56 of the web processing section 50 generates an animation frame in which the webpage moves in the screen in the direction opposite to that in S22 and disappears from one of the screen edges. The native image processing portion 48 of the native processing section 42 generates an animation frame in which the element images of the native image that disappeared from one of the screen edges in S22 emerge from the same screen edge and move in the screen in the direction opposite to that in S22.

The display image generation section 58 synchronizes and superimposes the frames of the generated native and web images and outputs the resultant images to the image display section 60, thus displaying, for example, a screen that has a motion opposite to that of the transition shown in FIG. 6. As a result, the display returns to the menu screen 110 shown in FIG. 4. In this stage, the web operation processing portion 54 of the web processing section 50 suspends the processing, and the native operation processing portion 46 of the native processing section 42 starts the processing. This switches web mode to native mode, thus allowing a user operation on the native image to be accepted again (S14). Such processing is repeated until the user performs the display termination operation. When the user does so, the display processing is terminated (Y in S20). It should be noted that the display termination operation may be actually accepted irrespective of which mode is selected.

When native mode is switched to web mode in S22 following Y in S16, the native processing section 42 and the web processing section 50 switch between the modes as the native processing section 42 detects the mode switching operation during processing of the native code and notifies the web processing section 50 adapted to process the web application to that effect. When web mode is switched to native mode in S30 following Y in S26, the native processing section 42 and the web processing section 50 switch between the modes as the web processing section 50 adapted to process the web application detects the mode switching operation and notifies the native processing section 42 to that effect.

The mode switching processing in S22 and S30 is implemented, in terms of software, using, for example, the native code and JavaScript as follows:

Switching from Native Mode to Web Mode
(1) The native code switches the focus target to the element images of the web image and generates an animation of the native image.
(2) The web application receives the switching between the focus targets as a window.focus event.
(3) The JavaScript of the web application generates an animation in response to that event.

Switching from Web Mode to Native Mode
(1) An Application Exit message reaches the native code via the API (Application Program Interface) implemented as a function to call up the native code (Injected Bundle).
(2) The native code switches the focus target to the element images of the native image and generates an animation of the native image.
(3) The web application generates an animation in response to the loss of the window.focus.

A description will be given next of another example of a change made to the display screen which can be implemented by using the information processing apparatus 10. When a webpage is displayed, it is common to follow a procedure to request data to the appropriate server by specifying the data address typified by a URL (Uniform Resource Locator) and receive the transmitted data with the information processing apparatus which then interprets and displays the data using a browser. In recent years, on the other hand, dynamic image display technologies such as Ajax have been put to practical use which update the display by requesting only the webpage content one by one to the server in accordance with a user operation while leaving the static data address as-is.

Figure 9:
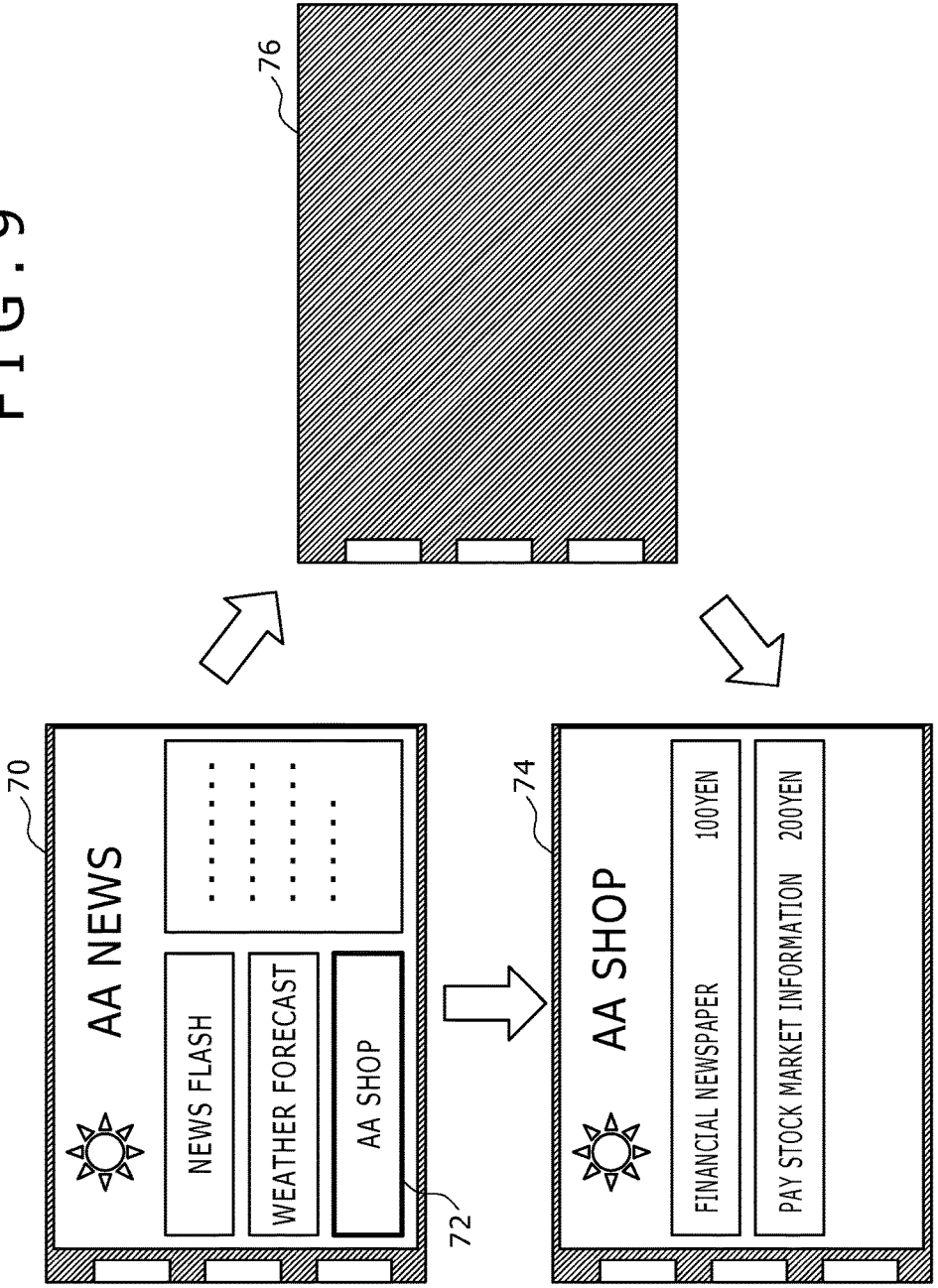
FIG. 9 is a diagram illustrating an example of a change that occurs in the screen when the display content is changed while at the same time leaving a static address as-is.

Such a technology makes it possible to implement the display mode in which at least part of the webpage of a site is updated to the content of other webpage if one of the GUI components displayed on the webpage of that site is selected. FIG. 9 is a diagram illustrating an example of a change that occurs in the screen when the display content is changed while at the same time leaving the static address as-is. First, a screen 70 is a display screen of a webpage before being updated. In the case of FIG. 9, the screen 70 is in the same state as the display screen 128*b* in web mode shown in FIG. 6. In the screen 70, three GUI components, i.e., "News Flash," "Weather Forecast," and "AA Shop" appear. We assume that each of these components is associated with a different webpage that displays further detailed information.

If the user makes an input to select an "AA Shop" GUI component 72, the information processing apparatus 10 requests, to the server which is the source of the webpage data, only data representing the content of the webpage for "AA Shop" that has been selected. Then, a screen 74 is displayed by updating at least part of the content of the original webpage using the data transmitted from the server. The screen 74 shown in FIG. 9 displays a list of merchandise such as "Financial Newspaper" and "Pay Stock Market Information" that can be purchased from the online store named "AA Shop." In the present embodiment, such a change is implemented by the web operation processing portion 54 and the web image processing portion 56 of the web processing section 50 in web mode.

This makes it possible to update the display content faster than by requesting data to the server by specifying the data address of each webpage and redrawing the images from scratch using the acquired data. On the other hand, updating takes place continuously from a previous page to a next page. As a result, it may become difficult to notice that the display content, i.e., the webpages, have changed, and understand the master-slave relationship between the webpages. In the present embodiment, for this reason, the switching between webpages is explicitly indicated by the native processing section 42. It should be noted that the term "switching between webpages" refers to updating only information in a page and not to changing the display screen as a whole by specifying a data address again as described above.

First, when the user performs an operation to switch the webpage being displayed, the web operation processing portion 54 of the web processing section 50 requests, to the server, post-switching data and notifies the native processing section 42 that a switching operation has been performed. In response to the notice, the native image processing portion 48 of the native processing section 42 makes a change to the native image in the transition process from the pre-switching screen 70 to the post-switching screen 74, thus indicating the delimitation in time where the switching occurred.

For example, of the native image located at the uppermost layer, the area appropriate to that of the web image at the lower layer where the webpage is displayed changes from transparent to opaque, temporarily hiding the webpage (screen 76 in FIG. 9). The transmittance may be reduced by a given amount. Then, when a post-switching web image is generated, the area of the native image in question may be changed to transparent again, thus displaying the screen 74. This indicates by a very short non-display period at least that a transition has occurred from one webpage to another.

It should be noted that an original webpage may be hidden and a new webpage may be exposed continuously. For example, when a webpage switching operation is performed, the transparency of the native image at the uppermost layer may be gradually reduced, and when the web image is updated, the transparency of the native image may be gradually increased. Alternatively, the area of the transparent area of the native image at the uppermost layer may be changed in such a manner that the viewable area of the original webpage is gradually reduced, and after the web image is updated, the viewable area of the new webpage is gradually increased. Still alternatively, the fact that a new webpage will be displayed may be indicated in the native image by text or graphics rather than simply hiding the webpage.

Figure 10:
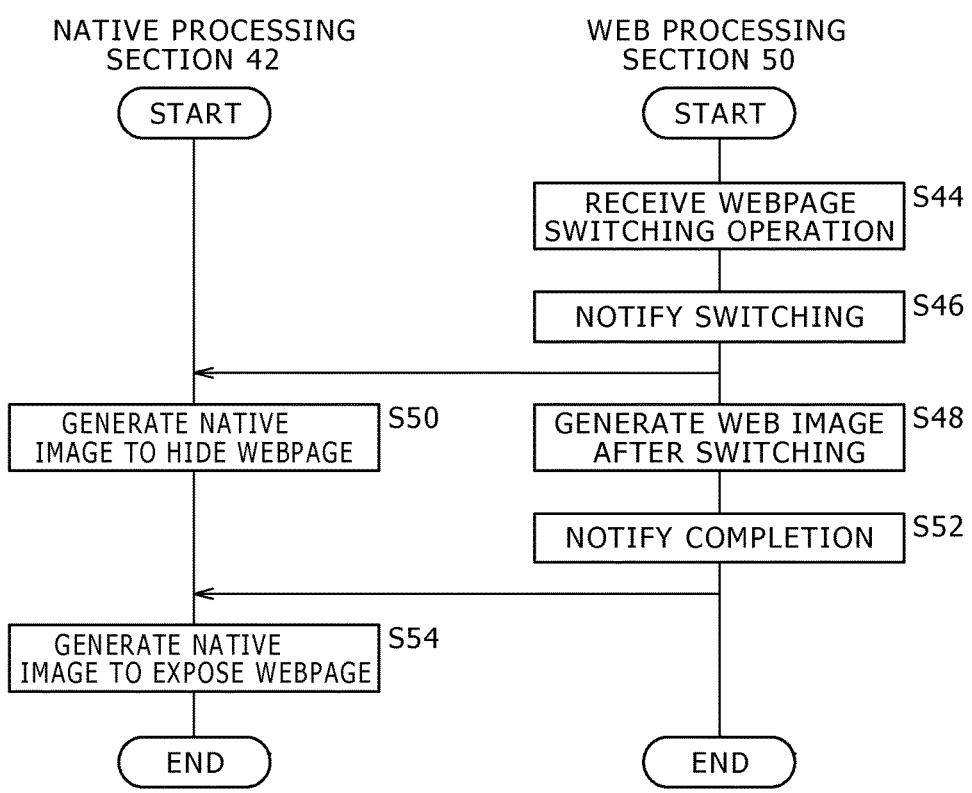
FIG. 10 is a flowchart illustrating steps through which the information processing apparatus according to the present embodiment goes to switch between webpages while at the same time leaving a static address as-is.

FIG. 10 is a flowchart illustrating steps through which the information processing apparatus 10 goes to switch between webpages while at the same time leaving the static address as-is. This flowchart begins from the state in which the webpage is primarily displayed after switching from native mode to web mode in S22 of FIG. 8. That is, we assume that the webpage is drawn in the web image, and that at least the appropriate area of the native image is transparent. When a webpage switching operation such as selection of one of the GUI components in the webpage is performed in this condition, the web operation processing portion 54 of the web processing section 50 accepts the operation (S44) and notifies the native processing section 42 to that effect (S46).

In response to the notice, the native image processing portion 48 of the native processing section 42 generates a native image to hide the webpage, for example, by reducing the transparency of the native image or gradually narrowing the transparent area (S50). The display image generation section 58 superimposes these native and web images and sequentially displays these images on the image display section 60, thus hiding the original web image. On the other hand, the web operation processing portion 54 requests, to the server 30, data representing the webpage content appropriate to the selected GUI component, receives the data and supplies it to the web image processing portion 56, thus causing the web image processing portion 56 to generate a web image representing the webpage after the switching (S48).

When the generation of the web image representing the post-switching webpage is completed, the web operation processing portion 54 notifies the native processing section 42 to that effect (S52). In response to the notice, the native image processing portion 48 of the native processing section 42 generates a native image to expose the post-switching webpage, for example, by increasing the transparency of the native image or gradually expanding the transparent area (S54). The display image generation section 58 superimposes these native and web images and sequentially displays these images on the image display section 60, thus exposing the post-transition web image.

In the embodiment described above, the images generated by the native and web applications are combined into a single screen by changing part of the images to transparent or translucent, superimposing these images, and displaying the superimposed images. This makes it possible to implement a screen display that strikes a balance between responsiveness to user operation and up-to-dateness of information. Further, the mixture of the two on the same screen allows to implement a seamless expression of images during switching between main targets subjected to information processing such as the native application and the web application, and data sources. This makes it easier to understand the relation between the information chain and different processes than displaying each image in a different window or switching the entire screen. Further, various combinations and arrangements are possible, thus making it possible to implement a screen display with high design quality tailored to the purpose of application and content.

Still further, when the target to be operated is switched between native and web applications, a change is made to the screen by using an animation in which the image of each application gradually emerges or disappears from one of the screen edges. As a result, irrespective of by which application the main screen is generated, it looks as if an image outside the main screen generated by other application is connected, thus making it possible to switch between targets to be operated by an easy and intuitive operation such as screen scrolling. Further, a similar-to-normal operation is possible by changing the main area of the screen into an image of an application and switching the active component from one GUI component to another.

Still further, when only the content of a webpage is switched by taking advantage of the hierarchical structure of the native and web images while at the same time leaving the static address as-is, a transition process is introduced to hide the original webpage with a native image. This explicitly indicates that the webpage has been switched, thus making it easy to understand that the display has been switched in response to an operation and where in the information chain the currently displayed image is located.

Thus, the embodiment of the present disclosure has been described above. It should be understood by those skilled in the art that the above embodiment is illustrative, that the combination of components and processes can be modified in various ways, and that such modification examples also fall within the scope of the present disclosure.

The present disclosure contains subject matter related to that disclosed in Provisional Patent Application No. 61/901,535 filed in the United States Patent and Trademark Office on Nov. 8, 2013, the entire content of which is hereby incorporated by reference.

What is claimed is:

1. An information processing apparatus comprising:
    a native processing section adapted to perform processing based on a program stored therein so as to generate, as a processing result, a native image on a native image plane, the native image including a native user interface element image, the native user interface element image being a native menu selector;
    a web processing section adapted to generate, based on data requested to a server, a web image on a web image plane including a web user interface element image, the web user interface element image being a web menu selector; and
    a display image generation section adapted to generate a display image and output the display image to a display device, the display image including the native image plane and the web image plane, the display image generation section adapted to arrange the native image plane and the web image plane so as to cause the native menu selector and the web menu selector to appear continuously on a same image plane defining a menu screen including the native menu selector and the web menu selector in a same menu,
    wherein the menu screen on which the native menu selector and the web user menu selector appear continuously together in the same menu is moved, in an animation to reveal a web page display screen in response to a user selection of one of the menu selectors on the menu screen when a target to be operated by the user is switched between the native image and the web image so as to change a configuration of the display image, and
    wherein the animation when completed retains a portion of the menu screen, which portion includes the native menu selector and the web menu selector superimposed on the revealed web page display screen, and the retaining communicates a heirarchical relationship between the native menu selector, the web menu selector, and the revealed web page display screen.

2. The information processing apparatus of claim 1, wherein the display image generation section changes part of the area of the native and web images to transparent or translucent and superimposes the images so as to generate a display image that simultaneously displays the element images, each making up one of the native and web images.

3. The information processing apparatus of claim 2, wherein when a user operation is made on the web image to update at least part of the web image, the web processing section notifies the native processing section to that effect, and
    the native processing section changes, to opaque, at least part of the native image that is displayed in a manner superimposed on top of the web image so as to hide at least part of the web image for a given period of time when the web image is updated.

4. The information processing apparatus of claim 1,
wherein the native processing section detects an operation made on the native image to switch the target to be operated to the web image and notifies the web processing section to that effect, and
the web processing section detects an operation made on the web image to switch the target to be operated to the native image and notifies the native processing section to that effect so that the native processing section and the web processing section move the element images, each making up one of the native and web images, in the same direction.

5. The information processing apparatus of claim 1,
wherein the native image includes an arrangement of a plurality of graphical user interface components including a graphical user interface component for switching the target to be operated to the web image, and
when the graphical user interface component for switching the target to be operated is selected, the native processing section and the web processing section move the element images, each making up one of the native and web images, in a direction perpendicular to the arrangement.

6. The information processing apparatus of claim 5,
wherein when the graphical user interface component for switching the target to be operated in the native image is a component of interest, the web processing section acquires element image data for the graphical user interface component from a server and displays an element image in the web image so that the element image displayed in the web image appears in the display image in addition to the arrangement of graphical user interface components.

7. The information processing apparatus of claim 5,
wherein when a screen is scrolled in the direction perpendicular to the arrangement of graphical user interface components while the graphical user interface component for switching the target to be operated is a component of interest, the web processing section determines that the graphical user interface component for switching the target to be operated has been selected and accepts an operation on the web image.

8. The information processing apparatus of claim 1, wherein:
a state in which a user operation on the native user interface element image is accepted is a native processing mode of the apparatus and a state in which a user operation on the web user interface element image is accepted is a web processing mode of the apparatus; and
the native processing mode is switched to the web processing mode for the web user interface element image to be operated by the user as the target and the web processing mode is switched to the native processing mode for the native user interface element image to be operated by the user as the target.

9. An information processing method for making a change to an image displayed by an information processing apparatus on a display device in response to a user operation, the information processing method comprising:
reading a program stored in an internal storage device and performing processing based on the program so as to generate, as a processing result, a native image on a native image plane, the native image including a native user interface element image, the native user interface element image being a native menu selector;
generating, based on data requested to a server, a web image on a web image plane including a web user interface element image, the web user interface element image being a web menu selector;
generating a display image and outputting the display image to the display device, the display image including the native image plane and the web image plane, and arranging the native image plane and the web image plane so as to cause the native menu selector and the web menu selector to appear continuously on a same image plane defining a menu screen including the native menu selector and the web menu selector in a same menu; and
moving the menu screen, on which the native menu selector and the web menu selector appear continuously together in the same menu, in an animation to reveal a web page display screen, in response to a user selection of one of the menu selectors on the menu screen when a target to be operated by the user is switched between the native image and the web image so as to change a configuration of the display image,
wherein the animation when completed retains a portion of the menu screen, which portion includes the native menu selector and the web menu selector superimposed on the revealed web page display screen, and the retaining communicates a heirarchical relationship between the native menu selector, the web menu selector, and the revealed web page display screen.

10. An apparatus having a computer, a non-transitory, computer readable storage medium containing a computer program, which when executed by the computer, causes the computer to carry out actions, comprising:
performing processing based on data stored in an internal storage device so as to generate, as a processing result, a native image on a native image plane, the native image including a native user interface element image, the native user interface element image being native menu selector;
generating, based on data requested to a server, a web image on a web image plane including a web user interface element image, the web user interface element image being a web menu selector;
generating a display image and outputting the display image to a display device, the display image including the native image plane and the web image plane, and arranging the native image plane and the web image plane so as to cause the native menu selector and the web menu selector to appear continuously on a same image plane defining a menu screen including the native menu selector and the web menu selector in a same menu; and
moving the menu screen, on which the native menu selector and the web menu selector appear continuously together in the same menu, in an animation to reveal a web page display screen, in response to a user selection of one of the menu selectors on the menu screen and when a target to be operated by the user is switched between the native image and the web image so as to change a configuration of the display image,
wherein the animation when completed retains a portion of the menu screen, which portion includes the native menu selector and the web menu selector superimposed on the revealed web page display screen, and the retaining communicates a heirarchical relationship between the native menu selector, the web menu selector, and the revealed web page display screen.

11. A non-transitory, computer-readable recording medium containing a computer program, which when executed by a computer, causes the computer to carry out actions, comprising:

performing processing based on data stored in an internal storage device so as to generate, as a processing result, a native image on a native image plane, the native image including a native user interface element image, the native user interface element image being native menu selector;

generating, based on data requested to a server, a web image on a web image plane including a web user interface element image, the web user interface element image being a web menu selector;

generating a display image and outputting the display image to a display device, the display image including the native image plane and the web image plane, and arranging the native image plane and the web image plane so as to cause the native menu selector and the web menu selector to appear continuously on a same image plane defining a menu screen including the native menu selector and the web menu selector in a same menu; and moving the menu screen, on which the native menu selector and the web menu selector appear continuously together in the same menu, in an animation to reveal a web page display screen, in response to a user selection of one of the menu selectors on the menu screen and when a target to be operated by the user is switched between the native image and the web image so as to change a configuration of the display image, wherein the animation when completed retains a portion of the menu screen, which portion includes the native menu selector and the web menu selector superimposed on the revealed web page display screen, and the retaining communicates a heirarchical relationship between the native menu selector, the web menu selector, and the revealed web page display screen.

* * * * *